(12) United States Patent
Moorman (10) Patent No.: US 10,571,016 B2
(45) Date of Patent: Feb. 25, 2020

(54) ELECTRONIC TRANSMISSION RANGE SELECTION FOR A CONTINUOUSLY VARIABLE TRANSMISSION

(71) Applicant: GM GLOBAL TECHNOLOGY OPERATIONS LLC, Detroit, MI (US)

(72) Inventor: Steven P Moorman, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 15/860,905

(22) Filed: Jan. 3, 2018

(65) Prior Publication Data
US 2019/0203828 A1 Jul. 4, 2019

(51) Int. Cl.
| F16H 61/02 | (2006.01) |
| F16H 61/00 | (2006.01) |
| F16H 61/66 | (2006.01) |
| F16H 63/48 | (2006.01) |
| F16H 63/34 | (2006.01) |
| F16H 61/662 | (2006.01) |

(52) U.S. Cl.
CPC ..... F16H 61/0206 (2013.01); F16H 61/0021 (2013.01); F16H 61/662 (2013.01); F16H 63/3483 (2013.01); F16H 63/483 (2013.01)

(58) Field of Classification Search
None
See application file for complete search history.

(56) References Cited

U.S. PATENT DOCUMENTS

| 15,171 A | 6/1856 | Croasdale |
| 4,628,773 A | 12/1986 | Itoh et al. |
| 4,665,775 A | 5/1987 | Nagamatsu et al. |
| 4,753,627 A | 6/1988 | Kawamoto |
| 5,108,348 A | 4/1992 | Bommann |
| 5,342,246 A | 8/1994 | Mori |
| 6,090,000 A * | 7/2000 | Senger ............ F16H 61/12 474/18 |
| 6,099,424 A | 8/2000 | Tsai et al. |
| 6,129,188 A * | 10/2000 | Friedmann ........ F16D 25/123 192/113.34 |

(Continued)

OTHER PUBLICATIONS

Steve Bodofsky, Understanding Transmission Solenoids, Gears, Apr. 2008, pp. 44-47.

Primary Examiner — Colby M Hansen (57) ABSTRACT

A hydraulic control system for a continuously variable transmission (CVT) of a motor vehicle includes a source of pressurized hydraulic fluid that communicates with an electronic transmission range selection (ETRS) subsystem. The ETRS subsystem may include one or more mode valves, a park servo, and a park mechanism. A pressure regulator subsystem is configured to provide a pressurized hydraulic fluid. The ETRS subsystem is in downstream fluid communication with the pressure regulator subsystem and has first and second outputs. The ETRS subsystem has an electronically-activated mode control valve in communication with the mode valve. The mode control valve is operable to move the mode valve between a first position and a second position. The ETRS subsystem is configured to selectively communicate pressurized hydraulic fluid to the forward clutch for the CVT through the first output and to the reverse clutch through the second output.

20 Claims, 4 Drawing Sheets

(56) References Cited

U.S. PATENT DOCUMENTS

| | | |
|---|---|---|
| 6,179,739 B1 | 1/2001 | Tsai et al. |
| 6,290,620 B1 | 9/2001 | Tsai et al. |
| 6,338,695 B1 * | 1/2002 | Aoki .................. B60K 6/405 477/160 |
| 6,364,802 B1 | 4/2002 | Yi |
| 6,428,445 B1 | 8/2002 | Friedmann |
| 6,432,015 B1 | 8/2002 | Takahashi |
| 6,585,617 B1 | 7/2003 | Moorman et al. |
| 6,619,323 B1 | 9/2003 | Stafford |
| 6,622,835 B2 | 9/2003 | Moorman et al. |
| 6,739,994 B1 | 5/2004 | Van Rooij et al. |
| 6,824,483 B1 | 11/2004 | Van Der Laan et al. |
| 6,826,908 B1 | 12/2004 | Stafford |
| 6,835,147 B2 | 12/2004 | Iwata et al. |
| 6,865,965 B2 | 3/2005 | Uchino |
| 7,028,821 B2 | 4/2006 | Wakayama |
| 7,041,018 B2 | 5/2006 | Ochiai et al. |
| 7,074,144 B2 | 7/2006 | Nobu |
| 7,104,907 B2 | 9/2006 | Jozaki et al. |
| 7,192,371 B2 | 3/2007 | Yamamoto et al. |
| 7,201,684 B2 | 4/2007 | Nobu |
| 7,229,372 B2 | 6/2007 | Shimanaka et al. |
| 7,384,372 B2 | 6/2008 | Katou |
| 7,677,997 B2 | 3/2010 | Hiramatsu et al. |
| 7,922,610 B2 | 4/2011 | Nihei et al. |
| 7,931,551 B2 | 4/2011 | Katou et al. |
| 7,951,026 B2 | 5/2011 | Soga et al. |
| 7,993,225 B2 | 8/2011 | Ogata |
| 8,012,051 B2 | 9/2011 | Soga |
| 8,038,553 B2 | 10/2011 | Soga |
| 8,066,595 B2 | 11/2011 | Ogata et al. |
| 8,117,750 B2 | 2/2012 | Younger |
| 8,177,121 B2 | 5/2012 | Zimmerman et al. |
| 8,182,397 B2 | 5/2012 | Shimizu et al. |
| 8,210,976 B2 | 7/2012 | Xie et al. |
| 8,435,138 B2 | 5/2013 | Shinohara et al. |
| 8,439,798 B2 | 5/2013 | Hanyu et al. |
| 8,478,495 B2 | 7/2013 | Kato |
| 8,500,600 B2 | 8/2013 | Moorman |
| 8,517,871 B2 | 8/2013 | Ogata et al. |
| 8,517,877 B2 | 8/2013 | Ishikawa et al. |
| 8,702,548 B2 | 4/2014 | Moorman |
| 8,894,545 B2 | 11/2014 | Berger |
| 8,932,167 B2 | 1/2015 | Berger et al. |
| 8,967,350 B2 | 3/2015 | Fujii et al. |
| 8,967,351 B2 | 3/2015 | Benson et al. |
| 9,068,648 B2 | 6/2015 | Moehlmann |
| 9,080,666 B2 | 7/2015 | Berger et al. |
| 9,194,465 B2 | 11/2015 | Lundberg |
| 9,254,831 B2 | 2/2016 | Berger et al. |
| 9,321,435 B2 | 4/2016 | Landino et al. |
| 9,341,199 B2 | 5/2016 | Benson et al. |
| 9,383,003 B2 | 7/2016 | Lundberg et al. |
| 9,435,431 B1 | 9/2016 | Lundberg et al. |
| 9,441,733 B2 | 9/2016 | Takahashi et al. |
| 9,523,425 B2 | 12/2016 | Inagaki et al. |
| 9,574,654 B2 | 2/2017 | Lundberg |
| 9,689,494 B2 | 6/2017 | Inagawa et al. |
| 9,816,607 B2 | 11/2017 | Berger et al. |
| 9,950,709 B2 | 4/2018 | Farahani et al. |
| 9,970,540 B2 | 5/2018 | Truong et al. |
| 9,982,774 B1 | 5/2018 | Jin et al. |
| 10,047,860 B2 | 8/2018 | Truong et al. |
| 10,071,740 B2 | 9/2018 | Ono et al. |
| 10,161,506 B2 | 12/2018 | Ghike et al. |
| 10,167,948 B2 | 1/2019 | Ghike et al. |
| 2008/0300075 A1 | 12/2008 | Yoshinami |
| 2013/0330216 A1 | 12/2013 | Yoshida et al. |
| 2018/0202541 A1 * | 7/2018 | Tsuchida ................. F16H 61/12 |
| 2019/0017592 A1 | 1/2019 | Berger et al. |
| 2019/0063597 A1 | 2/2019 | Berger et al. |

* cited by examiner

|     | 206 | 208 | 272 |
|-----|-----|-----|-----|
| P   | 0   | 0   | 0   |
| R   | 0   | 1   | 0/1 |
| N   | 0   | 0   | 1   |
| N*  | 1   | 1   | 0/1 |
| D   | 1   | 0   | 0/1 |

*Fig-3*

ELECTRONIC TRANSMISSION RANGE SELECTION FOR A CONTINUOUSLY VARIABLE TRANSMISSION

TECHNICAL FIELD

The present disclosure relates to an electro-hydraulic control system for a continuously variable transmission.

INTRODUCTION

A typical continuously variable transmission (CVT) includes a hydraulic control system that is employed to provide cooling and lubrication to components within the CVT and to actuate torque transmitting devices, such as drive clutches or torque converter clutches, and belt pulley positions. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and pulley actuator subsystems that include actuators configured to engage the torque transmitting devices and the pulleys that move the belt of the CVT. The pressurized hydraulic fluid delivered to the pulleys is used to position the belt relative to input and output variators in order to obtain different pulley ratios.

While previous hydraulic control systems are useful for their intended purpose, the need for new and improved hydraulic control system configurations within CVTs which exhibit improved performance, especially from the standpoints of efficiency, responsiveness and smoothness, is essentially constant. Accordingly, there is a need for an improved, cost-effective hydraulic control system for use in a hydraulically actuated CVT.

SUMMARY

A hydraulic control system with clutch control for a CVT is provided. The hydraulic control system includes a pressure regulator subsystem configured to provide pressurized hydraulic fluid, and an electronic range selection subsystem configured to selectively communicate the pressurized hydraulic fluid to the forward clutch and the reverse clutch. The electronic range selection subsystem may include two mode valves, wherein each mode valve is independently actuatable. In some forms, the mode valves are moveable, and confirmation of their position can be measured, prior to flowing pressurized hydraulic fluid to the mode valves. In addition, a clutch fault valve may be provided to provide pressurized hydraulic fluid to the electronic range selection subsystem in the case of a default.

In one form, which may be combined with or separate from other forms disclosed herein, a hydraulic control system for a propulsion system of a motor vehicle is provided, where the propulsion system has a continuously variable transmission, a forward clutch, and a reverse clutch. The hydraulic control system includes a pressure regulator subsystem configured to provide a pressurized hydraulic fluid. An electronic range selection subsystem is provided in downstream fluid communication with the pressure regulator subsystem and has first and second outputs. The electronic range selection subsystem has a mode valve and an electronically-activated mode control valve in communication with the mode valve. The mode control valve is operable to move the mode valve between a first position and a second position. The electronic range selection subsystem is configured to selectively communicate pressurized hydraulic fluid to the forward clutch through the first output and to the reverse clutch through the second output. A first pulley valve is provided and is configured to regulate fluid pressure to a primary pulley. The first pulley valve is actuatable by an electronically-activated primary pulley control valve. A second pulley valve is configured to regulate fluid pressure to a secondary pulley. The secondary pulley valve is actuatable by an electronically-activated secondary pulley control valve.

In another form, which may be combined with or separate from the other forms disclosed herein, a hydraulic control system for a propulsion system of a motor vehicle is provided, wherein the propulsion system has a continuously variable transmission, a forward clutch, and a reverse clutch. The hydraulic control system includes a pressure regulator subsystem configured to provide a pressurized hydraulic fluid and an electronic range selection subsystem in downstream fluid communication with the pressure regulator subsystem. The electronic range selection subsystem has first and second outputs, a first mode valve, and an electronically-activated first mode control valve in communication with the first mode valve. The first mode control valve is operable to move the first mode valve between a first position and a second position. The electronic range selection subsystem also has a second mode valve and an electronically-activated second mode control valve in communication with the second mode valve. The second mode control valve is operable to move the second mode valve between a first position and a second position. The electronic range selection subsystem is configured to selectively communicate pressurized hydraulic fluid to the forward clutch through the first output and to the reverse clutch through the second output. The electronic range selection subsystem has a range enablement valve configured to supply pressurized hydraulic fluid to the first and second mode valves. The range enablement valve is actuatable independently of the first and second mode valves.

In yet another form, a hydraulic control system for a propulsion system of a motor vehicle is provided, wherein the propulsion system has a continuously variable transmission, a forward clutch, and a reverse clutch. The hydraulic control system includes a pressure regulator subsystem configured to provide a pressurized hydraulic fluid and an electronic range selection subsystem in downstream fluid communication with the pressure regulator subsystem. The electronic range selection subsystem has first and second outputs, a first mode valve, and an electronically-activated first mode control valve in communication with the first mode valve. The first mode control valve is operable to move the first mode valve between a first position and a second position. The electronic range selection subsystem also has a second mode valve and an electronically-activated second mode control valve in communication with the second mode valve. The second mode control valve is operable to move the second mode valve between a first position and a second position. The electronic range selection subsystem is configured to selectively communicate pressurized hydraulic fluid to the forward clutch through the first output and to the reverse clutch through the second output. The electronic range selection subsystem has a range enablement valve configured to supply pressurized hydraulic fluid to the first and second mode valves. The hydraulic control system has a primary clutch pressure regulation valve and a clutch default valve in fluid communication with the primary clutch pressure regulation valve. The clutch default valve is actuatable by a normally high control solenoid.

Additional features may be provided, including but not limited to the following: a second mode valve; an electronically-activated second mode control valve in communication with the second mode valve; the second mode control valve being operable to move the second mode valve between a first position and a second position; a range enablement valve configured to supply pressurized hydraulic fluid to the first and second mode valves; the range enablement valve being actuatable independently of the first and second mode valves; a primary clutch pressure regulation valve; a clutch default valve in fluid communication with the primary clutch pressure regulation valve; the clutch default valve being actuatable by a normally high solenoid control valve; the clutch default valve being configured to supply pressured hydraulic fluid to the electronic range selection subsystem upon default; the hydraulic control system being configured to default into a forward drive mode if a default occurs while the forward clutch is in the forward drive mode; a clutch control solenoid valve configured to actuate the primary clutch pressure regulation valve; the clutch control solenoid valve being normally high; the electronic range selection subsystem being configured to communicate pressurized hydraulic fluid to the reverse clutch through the second output when the first mode valve is in the first position and the second mode valve is in the second position; and the electronic range selection subsystem being configured to communicate pressurized hydraulic fluid to the forward clutch through the first outlet when the first mode valve is in the second position and the second mode valve is in the first position.

Further additional features may be provided, including but not limited to the following: a torque converter control valve connected to a torque converter clutch and a cooler subsystem; the torque converter control valve being moveable between an apply position configured to communicate pressurized hydraulic fluid to an apply side of the torque converter clutch and a release position configured to communicate pressurized hydraulic fluid with a release side of the torque converter clutch and with the cooler subsystem; a torque converter clutch pressure regulator valve; a torque converter clutch control solenoid valve; the torque converter clutch pressure regulator valve being disposed downstream of the torque converter clutch control solenoid valve and the pressure regulator subsystem and upstream of the torque converter control valve; and the torque converter clutch pressure regulator valve being configured to regulate a pressure of hydraulic fluid supplied by the pressure regulator subsystem and provided to the torque converter control valve based on an output from the torque converter clutch control solenoid valve.

Still further additional features may be provided, including but not limited to the following: the hydraulic control system having a park mode and an out-of-park mode of operation; a park servo in downstream fluid communication with the first mode valve and the second mode valve; the park servo being moveable between a park position and an out-of-park position; the park servo being actuatable by a park control solenoid valve that is moveable between a first position and a second position; a park lock mechanism mechanically coupled to the park servo; the park servo being configured to mechanically move the park lock mechanism to place the hydraulic control system in the park mode when the first mode valve is in the first position, the second mode valve is in the first position, and the park control solenoid valve is in the first position; and the park servo being configured to move the park lock mechanism to place the transmission in the out-of-park mode when at least one of the first mode valve, the second mode valve, and the park control solenoid valve is in the second position.

Further aspects, advantages, and areas of applicability will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
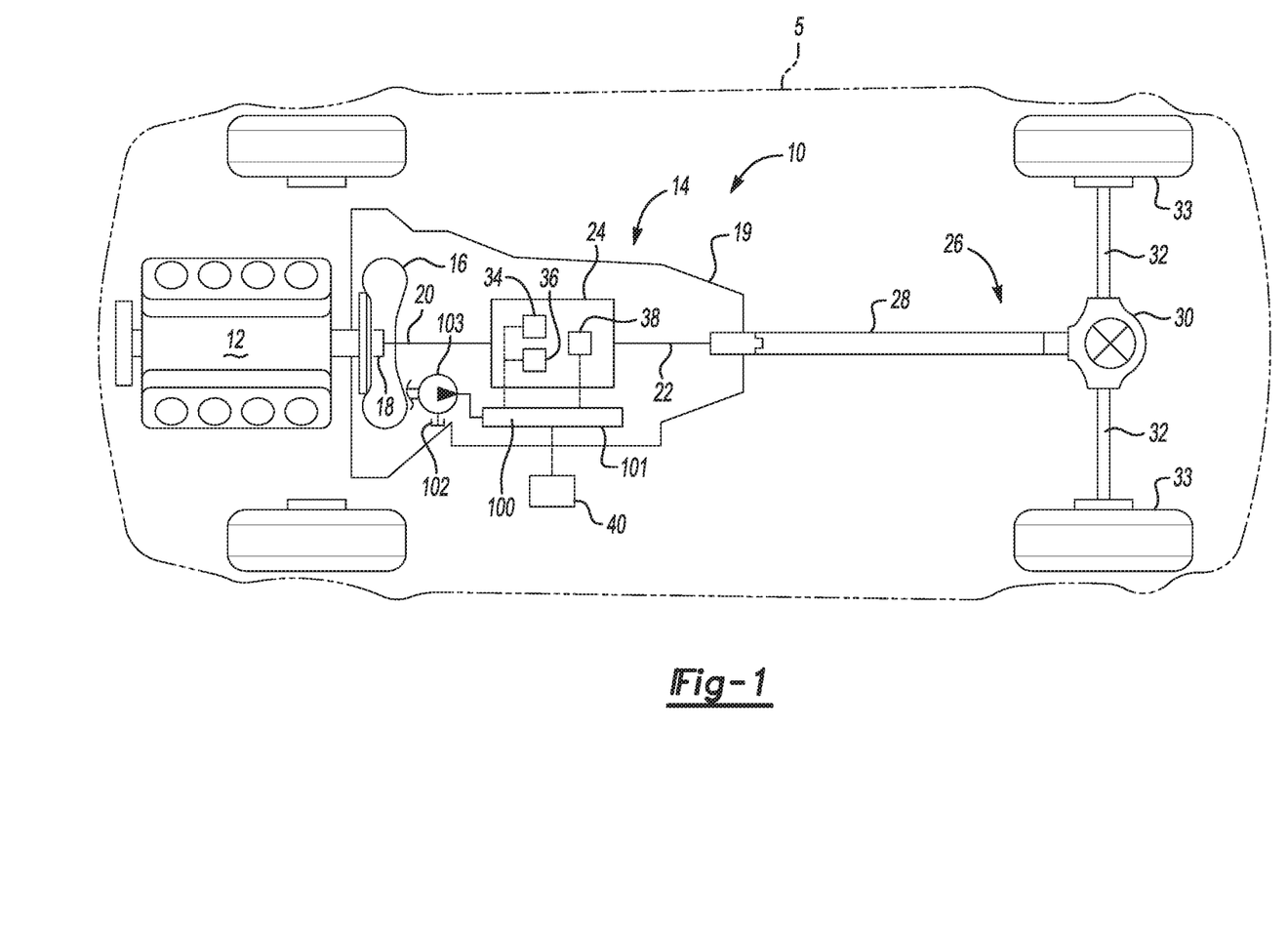
FIG. 1 is a diagrammatic plan view of a motor vehicle having an exemplary propulsion system with a continuously variable transmission and a hydraulic control system, according to the principles of the present disclosure.

With reference to FIG. 1, a motor vehicle is illustrated and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary propulsion system 10. It should be appreciated at the outset that while a rear-wheel drive propulsion system has been illustrated, the motor vehicle 5 may have a front-wheel drive propulsion system without departing from the scope of the present invention. The propulsion system 10 generally includes an engine 12 interconnected with a transmission 14.

The engine 12 may be a conventional internal combustion engine or an electric engine, hybrid engine, or any other type of prime mover, without departing from the scope of the present disclosure. The engine 12 supplies a driving torque to the transmission 14 through a torque converter 16. The torque converter 16 includes a torque converter clutch 18 that, when applied or engaged, mechanically couples the output of the engine 12 to the input of the transmission 14.

The transmission 14 is preferably a continuously variable transmission and has a typically cast, metal housing 19 which encloses and protects the various components of the transmission 14. The housing 19 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a powerflow arrangement 24 of gears, clutches, and pulleys. The transmission input shaft 20 is functionally interconnected with the engine 12 via the torque converter 16 and receives input torque or power from the engine 12. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the powerflow arrangement 24.

The powerflow arrangement 24 generally includes a forward clutch 34, a reverse clutch or brake 36, and a pulley assembly 38. The powerflow arrangement 24 may also include a plurality of gear sets, a plurality of shafts, and additional clutches or brakes. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The forward clutch 34 is selectively engageable to initiate a forward drive mode while the reverse clutch or brake 36 is selectively engageable to initiate a reverse drive mode. The pulley assembly 38 is a continuously variable unit that includes a chain or belt wrapped between a primary pulley and a secondary pulley (not shown). Translation of the pulleys correlates to movement of the belt or chain which continuously varies the output or pulley ratio of the transmission 14.

The transmission 14 includes a transmission control module 40. The transmission control module 40 is preferably an electronic control device having a preprogrammed digital computer or processor, control logic or circuits, memory used to store data, and at least one I/O peripheral. The control logic includes or enables a plurality of logic routines for monitoring, manipulating, and generating data and control signals. The transmission control module 40 controls the actuation of the forward clutch 34, the reverse clutch or brake 36, the pulley assembly 38, and the torque converter clutch 18 via a hydraulic control system 100. In another example, the transmission control module 40 is an engine control module (ECM), or a hybrid control module, or any other type of controller.

The hydraulic control system 100 is disposed within a valve body 101 that contains and houses via fluid paths and valve bores most of the components of the hydraulic control system 100. These components include, but are not limited to, pressure regulation valves, directional valves, solenoid control valves, etc. The valve body 101 may be attached to a bottom of the transmission housing 19 in rear-wheel drive transmissions or attached to a front of the transmission housing 19 in front-wheel drive transmissions, by way of example. The hydraulic control system 100 is operable to selectively engage the clutches/brakes 34, 36, 18 and to provide cooling and lubrication to the transmission 14 by selectively communicating a hydraulic fluid from a sump 102 under pressure from either an engine driven pump 103 or an accumulator (not shown). The pump 103 may be driven by the engine 12 or by an auxiliary engine or electric motor.

Figure 2A:
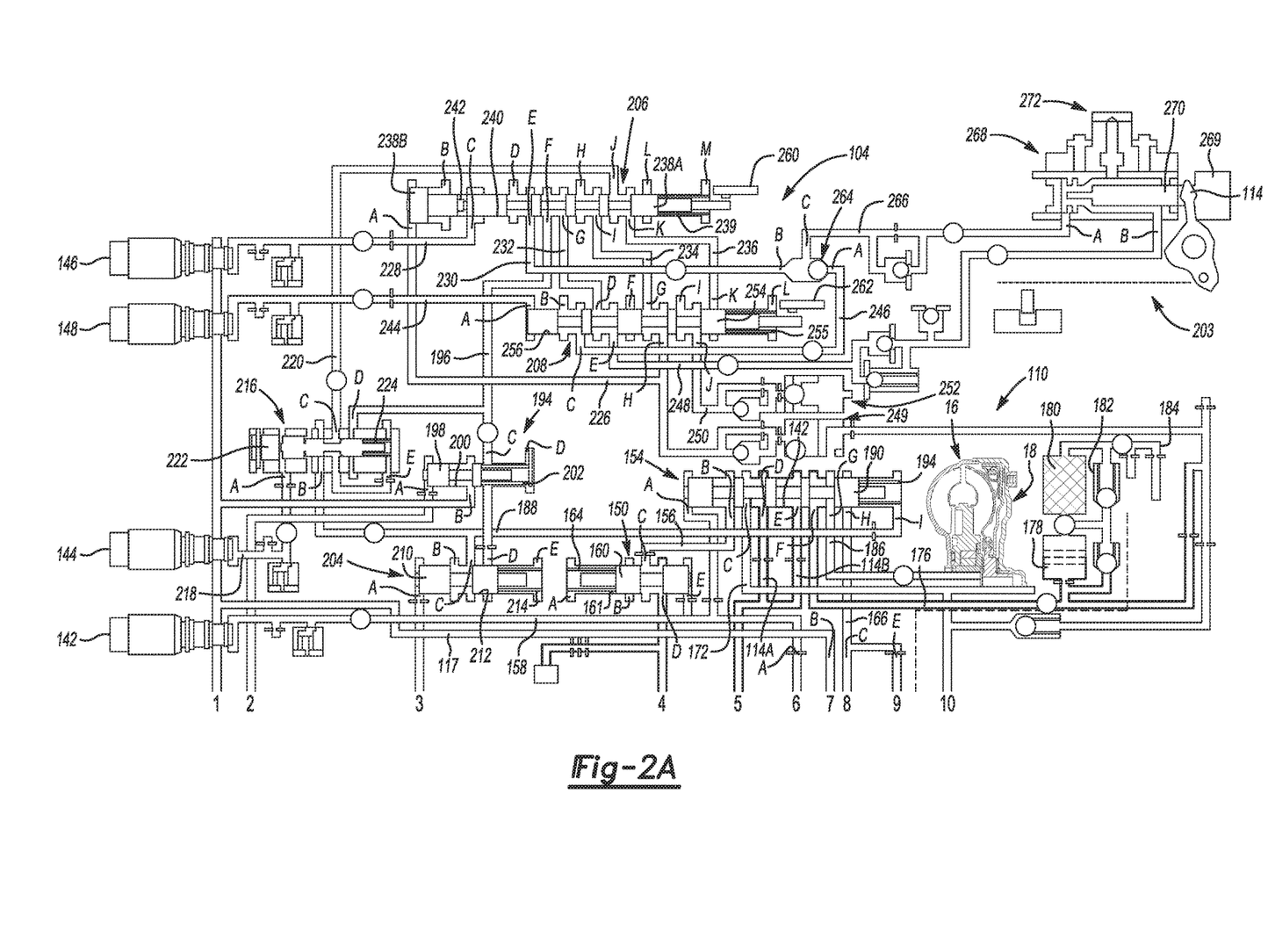
FIG. 2A is a schematic diagram of a portion of the hydraulic control system of the propulsion system of FIG. 1, according to the principles of the present disclosure.
Figure 2B:
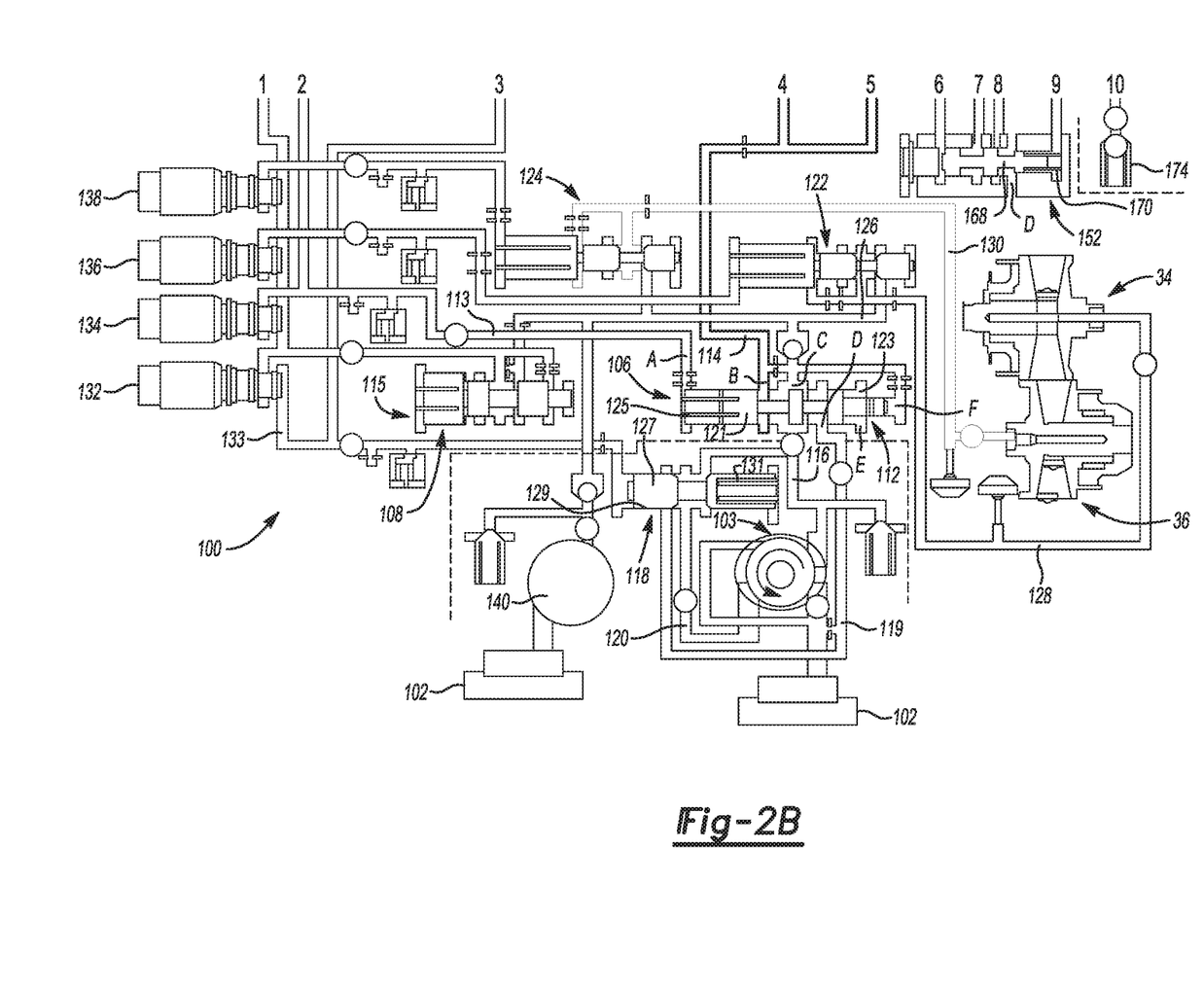
FIG. 2B is a schematic diagram of another portion of the hydraulic control system of the propulsion system of FIG. 1, in accordance with the principles of the present disclosure.

With reference to FIGS. 2A-2B, a portion of the hydraulic control system 100 is illustrated. The hydraulic control system 100 generally includes a plurality of interconnected or hydraulically communicating subsystems including an electronic transmission range selection (ETRS) control subsystem 104, a pressure regulator subsystem 106, an actuator feed subsystem 108, and a torque converter clutch control subsystem 110. The hydraulic control system 100 may also include various other subsystems or modules, such as a lubrication subsystem, without departing from the scope of the present disclosure.

The pressure regulator subsystem 106 is operable to provide and regulate pressurized hydraulic fluid, such as transmission oil, throughout the hydraulic control system 100. The pressure regulator subsystem 106 draws hydraulic fluid from the sump 102. The sump 102 is a tank or reservoir preferably disposed at the bottom of the transmission housing 19 to which the hydraulic fluid returns and collects from various components and regions of the transmission 14. The hydraulic fluid is forced from the sump 102 and communicated throughout the hydraulic control system 100 via the transmission fluid pump 103. The transmission fluid pump 103 may be, for example, a gear pump, a vane pump, a gerotor pump, or any other positive displacement pump. The pressure regulator subsystem 106 may also include an alternate source of hydraulic fluid that includes an auxiliary pump 140 preferably driven by an electric engine, motor, battery, or other prime mover (not shown), or an accumulator. The auxiliary pump 140 may be included to provide line pressure in, for example, start/stop applications, if desired. The hydraulic fluid from the transmission fluid pump 103 is controlled by a pressure regulator valve 112. The pressure regulator valve 112 regulates the pressure of the hydraulic fluid from the transmission fluid pump 103 and feeds pressurized hydraulic fluid to a converter feed line 114. The pressure regulator subsystem 106 may also include various other valves and solenoids without departing from the scope of the present disclosure.

For example, the line pressure regulator valve includes ports 112A-E, numbered consecutively from left to right in FIG. 2B. Port 112A communicates with a line pressure signal line 113 from a line pressure control solenoid valve 134. Port 112B communicates with the converter feed line 114. Ports 112C and 112F communicate with line pressure 126. Port 112D communicates with a bypass circuit 119. Port 112E is an exhaust port. The pressure regulator valve 112 further includes a spool valve 121 slidably disposed within a bore 123 formed in the valve body 101. The spool valve 121 is moveable against a biasing member 125, such as a coiled spring, to control line pressure.

The pressure regulator valve 112 regulates the flow and/or pressure of the transmission fluid to a primary pulley valve 122, a secondary pulley valve 124, and/or for one or more other actuators/functions, such as the torque converter 16 and other valves within the hydraulic control system 100. The pressure regulator valve 112 may also provide fluid from the transmission fluid pump 103 for cooling and lubrication. One output pressure of the pressure regulator valve 112 may be referred to as a line pressure 126.

The transmission fluid pump 103 outputs transmission fluid to the pressure regulator valve 112 through a first fluid path 116, and the transmission fluid pump 103 also outputs the transmission fluid to a switching valve 118 via a second fluid path 120. The switching valve has a spool 127 slidably disposed within a bore 129, which is biased into a first position by a biasing member 131, such as a spring.

When the switching valve 118 is open (in a second position), the transmission fluid flows from the transmission fluid pump 103 through the switching valve 118 to the pressure regulator valve 112. In various implementations, the switching valve 118 may be integrated within the transmission fluid pump 103. When the switching valve 118 is closed (in a first position), the second fluid path 120 is connected back to pump suction.

When the switching valve 118 is in the closed position, or the first position, the switching valve 118 blocks transmission fluid flow through the second fluid path 120 and connects the second path 120 to pump suction, so that the transmission fluid pump 103 pumps transmission fluid to the pressure regulator valve 112 only through the first fluid path 116, and the transmission fluid pump 103 operates in a partial (e.g., half) mode operation. Since the transmission fluid pump 103 is driven by the engine 12, a fuel efficiency increase (i.e., a fuel consumption decrease) of the engine 12 may be realized (relative to full mode operation) during operation in the partial mode as the transmission fluid pump 103 imposes a lesser torque load on the engine 12.

When the switching valve 118 is in the open position, or the second position, pressurized hydraulic fluid is provided to the spool 127 through the signal line 133 to compress the spool 127 against the spring 131, and the transmission fluid pump 103 operates in a full mode operation. The switching valve 118 enables transmission fluid flow through the second fluid path 120 when in the open position, so that the transmission fluid pump 103 pumps transmission fluid to the pressure regulator valve 112 through both of the first fluid path 116 and the second fluid path 120.

The switching valve 118 may be controlled to transition from the closed position to the open position under various circumstances. For example only, the switching valve 118 may be transitioned from the closed position to the open position when a rate of change of the target ratio between the input and output shafts 20, 22 is greater than a predetermined value. In another example, the switching valve 118 may be transitioned from the open position to the closed position when a rate of change of the target ratio between the input and output shafts 20, 22 is less than a predetermined value.

The actuator feed subsystem 108 provides hydraulic fluid to various control devices or actuators, such as solenoids, throughout the hydraulic control system 100. The actuator feed subsystem 108 includes a feed limit valve 115 that controls or limits the pressure of hydraulic fluid supplied to the actuators. For example, the feed limit valve 115 is configured to provide fluid to a binary solenoid control valve 132, a line pressure control solenoid control valve 134, a primary pulley solenoid control valve 136, a secondary pulley solenoid control valve 138, a TCC control solenoid control valve 142, a clutch control solenoid control valve 144, a first mode solenoid control valve 146, and/or a second mode solenoid control valve 148. Each of the solenoid control valves 132, 134, 136, 138, 142, 144, 146, 148 may be, for example, VBS or VFS valves that may be normally high or normally low. In one example, each of the solenoid control valves 132, 134, 136, 138, 144 may be normally high, and each of the solenoid control valves 142, 146, 148 may be normally low. Each of the solenoid control valves 132, 134, 136, 138, 142, 144, 146, 148 may be electrically-activated. In other examples, the control valves 132, 134, 136, 138, 142, 144, 146, 148 may be another type of control valve that does not include a solenoid, and which may be electrically-activated.

The primary pulley valve 122, controlled and actuated by the electrically-activated primary pulley solenoid control valve 136, regulates the flow (and pressure) of the transmission fluid to the primary pulley 34. For example, the primary pulley valve 122 may be opened to increase the flow/pressure of the transmission fluid to the primary pulley 34 to expand the primary pulley 34 and change the pulley ratio of the primary pulley 34. The primary pulley valve 122 may be closed to decrease the flow/pressure of the transmission fluid to the primary pulley 34 to contract the primary pulley 34 and change the pulley ratio of the primary pulley 34. An output pressure of the primary pulley valve 122 may be referred to as a primary pulley pressure 128.

The secondary pulley valve 124, controlled and actuated by the electrically-activated secondary pulley solenoid control valve 138, regulates the flow (and pressure) of the transmission fluid to the secondary pulley 36. For example, the secondary pulley valve 124 may be opened to increase the flow of the transmission fluid to the secondary pulley 36 to expand the secondary pulley 36 and change the pulley ratio of the secondary pulley 36. The secondary pulley valve 124 may be closed to decrease the flow of the transmission fluid to the secondary pulley 36 to contract the secondary pulley 36 and change the pulley ratio of the secondary pulley 36. An output pressure of the secondary pulley valve 124 may be referred to as a secondary pulley pressure 130.

The torque converter clutch control subsystem 110 controls the engagement of the torque converter clutch 18 and cooling of the torque converter 16. The torque converter clutch control subsystem 110 generally includes a torque converter clutch (TCC) fault valve 150, a TCC pressure regulation valve 152, a torque converter control valve 154, and the TCC solenoid control valve 142.

The TCC fault valve 150 includes ports 150A-E, numbered consecutively from left to right in FIG. 2A. Ports 150A and 150B are exhaust ports that communicate with the sump 102 or an exhaust backfill circuit (not shown). Port 150C is connected to the torque converter control valve 154 via a fluid line 156. Port 150D is connected to and receives pressurized hydraulic fluid from the converter feed line 114. Port 150E is connected to the TCC solenoid control valve 142 via a signal line 158. The TCC fault valve 150 further includes a spool valve 160 slidably disposed within a bore 161 formed in the valve body 101. The spool valve 160 is moveable between a boost position with the spool valve 160 moved to the left as shown in FIG. 2A, and a failsafe position with the spool valve 160 moved to the right. A biasing member 164, such as a coiled spring, biases the spool valve 160 to the failsafe position. Hydraulic fluid from the TCC solenoid control valve 142, via signal line 158, moves the spool valve 160 to the boost position. In the boost position, port 150B communicates with port 150C and port 150D is closed off. In the failsafe position, port 150C communicates with port 150D, and port 150B is closed off.

The TCC pressure regulation valve 152 regulates hydraulic fluid pressure communicated to the torque converter control valve 154. The TCC pressure regulation valve 152 includes fluid ports 152A-E, numbered from left to right in FIG. 2B. Port 152A is connected to the signal line 158. Fluid port 152B is connected to and receives hydraulic fluid from the actuator feed line 117. Ports 152C and 152E are connected to a fluid line 166. Port 152 D is an exhaust port. A regulation valve 168 is positioned within the TCC pressure regulation valve 152. The regulation valve 168 regulates the pressure of hydraulic fluid communicated from port 152B to port 152C, and therefore to the torque converter control valve 154 via fluid line 166. The regulation valve 168 is positioned by a pressure signal sent from the TCC solenoid control valve 142 via port 152A. The TCC solenoid control valve 142 commands a fluid pressure by sending pressurized hydraulic fluid to port 152A to act on the regulation valve 168. Simultaneously, hydraulic fluid from port 152C feeds back on the regulation valve 168 via port 152E and acts on the opposite side of the regulation valve 168. Pressure balance between the commanded pressure from the TCC solenoid control valve 142, pressure within the fluid line 166, and a spring 170 is achieved as the regulation valve 168 moves and allows selective communication between ports 152B and 152C.

The torque converter control valve 154 controls the engagement of the torque converter clutch 18 within the torque converter 16. The torque converter control valve 154 includes ports 154A-I, numbered consecutively from left to right in FIG. 2A. Port 154A is connected to the signal line 158. Port 154B is connected to the fluid line 156. Port 154C is connected to a TCC release line 172. The TCC release line 172 communicates with a blow-off valve 174 and with a release side of the torque converter clutch 18. Ports 154D and 154E communicate with parallel branches 114A and 114B of the converter feed line 114. Port 154F communicates with a cooler line 176. The cooler line 176 communicates with a cooler 178 and a filter 180 disposed in series with one another. The cooler 178 reduces a temperature of hydraulic fluid flowing through the filter 180, as is known in the art. A blow-off valve 182 is disposed in parallel with the filter 180. Hydraulic fluid from the cooler 178 and filter 180 communicate through a lubrication circuit 184 with the sump 102. Port 154G is connected to a TCC apply line 186. The TCC apply line 186 communicates with an apply side of the torque converter clutch 18. Port 154H communicates with the TCC pressure regulator valve 152 via fluid line 166. Port 154I communicates with fluid line 188, which will be described in further detail below.

The torque converter control valve 154 includes a spool valve 190 slidably disposed within a bore 192 formed in the valve body 101. The spool valve 190 is moveable between an apply position with the spool valve 190 moved to the right as shown in FIG. 2A, and a release position with the spool valve 190 moved to the left. A biasing member 194, such as a coiled spring, biases the spool valve 190 to the release position. Hydraulic fluid from the TCC control solenoid valve 142, via signal line 158, moves the spool valve 190 to the apply position. In the release position, ports 154B, 154E, and 154H are blocked, port 154C communicates with port 154D, and port 154F communicates with port 154G. In the apply position, port 154B communicates with port 154C, port 154D is blocked, port 154E communicates with port 154F, and port 154G communicates with port 154H.

The TCC control solenoid valve 142 is configured to control the position of the TCC pressure regulator valve 152 and to move the TCC fault valve 150. The TCC control solenoid valve 142 is preferably a normally low solenoid, as stated above. The TCC control solenoid valve 142 is in electrical communication with the transmission control module 40.

The ETRS control subsystem 104 controls the forward and reverse clutches 34, 36 and a park control valve 268. Generally, the ETRS control subsystem 104 converts electronic input for a requested range selection (Drive, Reverse, Park) into hydraulic and mechanical commands. The mechanical commands include engaging and disengaging a park mechanism 114.

The ETRS control subsystem 104 includes a range enablement valve 194, a clutch default valve 204, and first and second mode valves 206, 208. The range enablement valve 194 includes fluid ports 194A-D. Fluid port 194A is in communication with the line pressure signal line 113. Fluid port 194B is in communication with the actuator feed line 117. Fluid port 194C communicates with a range feed line 196. Fluid port 194D is an exhaust port that communicates with the sump 102 or an exhaust backfill circuit. The range enablement valve 194 further includes a spool valve 198 slidably disposed within a bore 200. When pressurized fluid is supplied through the signal line 113, fluid pressure acts upon the spool valve 198 through the fluid port 194A and moves the spool valve 198 against a spring 202 into a stroked or enabled position, by way of example. The spool valve 198 is actuated to a de-stroked position by the spring 202. When the spool valve 198 is stroked, the fluid port 194B communicates with the fluid port 194C. When the spool valve 198 is in the de-stroked position, the fluid port 194B is blocked. The range enablement valve 194 is configured to cut off hydraulic fluid to the clutches 34, 36 and to a park assembly 203 until a safe mode valve position is achieved with the first and second mode valves 206, 208.

The range feed line 196 communicates with the clutch default valve 204 and with the first mode valve 206. The clutch default valve 204 has fluid ports 204A-E, numbered from left to right in FIG. 2A. Fluid port 204A is in communication with the signal line 133. Fluid ports 204B and 204E are exhaust ports that communicate with the sump 102 or an exhaust backfill circuit. Fluid port 204C communicates with a fluid line 188. Fluid port 204D communicates with range feed line 196. The clutch fault valve 204 further includes a spool valve 210 slidably disposed within a bore 212. When pressurized hydraulic fluid is supplied through the signal line 133, fluid pressure acts upon the spool valve 210 through the fluid port 204A and moves the spool valve 210 against a spring 214 into a stroked or enabled position, by way of example. The spool valve 210 is actuated to a de-stroked position by the spring 214. When the spool valve 210 is stroked, the fluid port 204C communicates with the fluid port 204D, bringing fluid line 188 into communication with the range feed line 196. When the spool valve 210 is in the de-stroked position, the fluid port 204D is blocked, and the fluid port 204C communicates with exhaust (fluid port 204B). The clutch default valve 204 provides a secondary means of activating the clutches 34, 36, for "limp home protection," which is described in greater detail below.

The primary clutch pressure regulation valve is generally designated at 216. The primary clutch pressure regulation valve 216 is configured to drive the forward and reverse clutches through the mode valves 206, 208. The primary clutch pressure regulation valve 216 regulates hydraulic fluid pressure communicated to the mode valves 206, 208. The primary clutch pressure regulation valve 216 has fluid ports A-E, numbered from left to right in FIG. 2A. Port 216A is connected to a signal line 218 that is actuatable by the clutch control solenoid valve 144. Port 216B communicates with the fluid line 188, which is also in communication with the clutch fault valve 204 and the torque converter control valve 154, as explained above. Ports 216C and 216E communicate with a feed line 220 to the first mode valve 206. Fluid port 216D communicates with the range enable fluid line 196.

A regulation valve 222 is positioned within the primary clutch pressure regulation valve 216. The regulation valve 222 regulates the pressure of hydraulic fluid communicated from port 216B to port 216C, and therefore to the first mode valve 206. The regulation valve 222 is positioned by a pressure signal sent from the clutch control solenoid valve 144 via fluid line 218 to port 216A. Simultaneously, pressurized hydraulic fluid from port 216C feeds back on the regulation valve 222 via port 216E and acts on the opposite side of the regulation valve 222. Pressure balance between the commanded pressure from the clutch control solenoid 144, pressure within the fluid line 220, and a spring 224 is achieved as the regulation valve 222 moves and allows selective communication between ports 216C and 216E.

The first and second mode valve assemblies 206, 208 communicate in series with one another and with the range enablement valve 194. The first mode valve 206 includes ports 206A-M, numbered consecutively from left to right. Ports 206B, D, H, L, and M are exhaust ports that communicate with the sump 102 or an exhaust backfill circuit. Ports 206A communicates with a drive clutch actuation and feedback line 226. Port 206C communicates with a first mode signal line 228 that is pressured by electronic actuation of the first mode solenoid valve 146. Port 206E communicates with an out-of-park feed line 230. Port 206F communicates with the range enable feed line 196. Port 206G communicates with a return-to-park fluid line 232. Port 206I communicates with a fluid line 234. Port 206J communicates with the first mode valve feed line 220. Port 206K communicates with a reverse feed line 236.

The first mode valve assembly 206 further includes spool valves 238A and 238B slidably disposed within a bore 240. The spool valves 238A, 238B are actuated by the hydraulic fluid provided through lines 228 and 226. A biasing spring 239 is disposed on the right end of the spool valve 238B, which biases the spool valves 238A, 238B to the left in the orientation of FIG. 2A. The spool valves 238A, 238B are moveable between a first position (as shown in FIG. 2A), and a second position in which the spool valve 238A is moved to the right in the orientation of FIG. 2A. In the first position, port 206E communicates with port 206D and is exhausted; port 206F communicates with port 206G; port 206I communicates with port 206H and is exhausted; and port 206J communicates with port 206K, connecting fluid line 220 with reverse feed line 236. To move the first mode valve assembly 206 from the first position to the second position, signal line fluid from fluid line 228 fills up area 242, causing the spool valve 238A to move to the right. In the second position, fluid port 206E communicates with fluid port 206F such that the range enable line 196 communicates with the out-of-park feed line 230; fluid port 206G communicates with fluid port 206H and is exhausted; fluid port 206I communicates with fluid port 206J, thereby connecting the forward feed line 234 to the fluid line 220; and fluid port 206K communicates with fluid port 206L and is exhausted.

The second mode valve assembly 208 generally includes ports 208A-L. Fluid port 208A communicates with a second mode signal line 244 that is pressurized by electronic actuation of the second mode solenoid valve 148. Ports 208B, 208F, 208I, and 208L are exhaust ports that communicate with the sump 102 or an exhaust backfill circuit. Port 208C communicates with a reverse out-of-park feed line 246. Port 208D communicates with the fluid line 232. Port 208E communicates with a return-to-park feed line 248. Port 208G communicates with the forward feed line 234. Port 208H communicates with the drive clutch actuation and feedback line 226, which is connected to a forward clutch actuation circuit 249 configured to actuate the forward clutch 34. Port 208J communicates with a reverse clutch actuation line 250 that is connected to a reverse clutch actuation circuit 252 configured to actuate the reverse clutch 36.

The second mode valve assembly 208 includes one or more spool valve 254 slidably disposed within a bore 256. The spool valve 254 is moveable between a first position and a second position. In the first position (shown in FIG. 2A), port 208C communicates with port 208B and is exhausted; port 208D communicates with port 208E, thereby connecting fluid line 232 with return-to-park feed line 248; port 208G communicates with port 208H, thereby connecting forward feed line 234 with the drive clutch actuation and feedback line 226; and port 208J communicates with port 208I and is exhausted. Port 208K is blocked. A biasing spring 255 is disposed on the right end of the spool valve 254, which biases the spool valve 254 to the left in the orientation of FIG. 2A.

To move the spool valve 254 to the second position (to the right in the configuration of FIG. 2A), fluid is fed through signal line 244 to port 208A, which is accomplished by energizing (or deenergizing) solenoid valve 148. In the second position, port 208C communicates with port 208D, thereby connecting the fluid line 232 with the reverse out-of-park feed line 246; port 208E communicates with port 208F and is exhausted; port 208G is closed off; port 208H communicates with port 208I and is exhausted; and port 208J communicates with port 208K, thereby connecting the reverse feed line 236 with the reverse clutch actuation line 250.

Therefore, when the first mode valve 206 is in the "stroked" position, or second position, while the second mode valve 208 remains in the "destroked" position, or first position, the transmission is in "Drive," which is a forward drive mode. When the first mode valve 206 is in the "destroked" position, or first position, while the second mode valve 208 is in the "stroked" position, or second position, the transmission is in "reverse."

The first mode valve assembly 206 may include one, two, or more position sensors 260, and the second mode valve assembly 208 may include one, two, or more position sensors 262, by way of example, which are configured to determine the position of the spools 238A, 254 within the mode valves 206, 208, respectively.

A check valve 264 may be connected to fluid lines 230 and 246. The check valve 264 includes three ports 264A-C. Port 264A is connected to the reverse out-of-park feed line 246. Port 264B is connected to the forward out-of-park feed line 230. Port or outlet 264C is connected to an out-of-park (OOP) fluid line 266. The check valve 264 closes off whichever of the ports 264A and 264B is delivering the lower hydraulic pressure and provides communication between the outlet port 264C and whichever of the ports 264A and 264B has or is delivering higher hydraulic pressure.

The return-to-park feed line 248 and the OOP fluid line 266 each communicate with a Park actuation valve 268, which may be a servo valve. The Park actuation valve 268 includes ports 268A and 268B, each located on either side of a piston 270. The piston 270 is mechanically coupled to the park mechanism 114, which may include a park pawl configured to engage a park gear (not shown). Port 268A communicates with the OOP fluid line 266, and port 268B communicates with the return-to-park fluid line 248. The piston 270 moves upon contact by the pressurized hydraulic fluid supplied by one of the fluid lines 266, 248, thereby mechanically disengaging or engaging the park mechanism 114. A bias spring returns the piston 270 back to park without hydraulic assistance.

The park mechanism 114 is connected with an out-of-park (OOP) solenoid 272, also referred to as a park inhibit solenoid assembly (PISA). The OOP solenoid 272 is actuatable to mechanically prevent the park mechanism 114 from engaging during an engine stop-start event (i.e. when the vehicle is intended to be mobile during an automatic engine stop). The OOP solenoid 272 may also be used to hold the park servo valve 268 disengaged when it is desirable to operate out of Park at other times (such as in Neutral).

The park actuation valve assembly 268 may also include one, two, or more position sensors within a position switch assembly 269, by way of example, which are configured to determine the position of the park mechanism 114.

As noted above, the ETRS subsystem 104 feeds pressurized hydraulic fluid to the forward clutch actuation circuit 249 and/or the reverse clutch actuation circuit 252 via the clutch regulation line 220 and either the drive clutch actuation and feedback line 226 or the reverse clutch actuation line 250. The drive clutch actuation and feedback line 226 also feeds back to the first mode valve 206 at port 206A to latch the first mode valve 206 in the second position, or the "1" position, therefore latching the transmission 14 in the forward drive mode.

Figure 3:
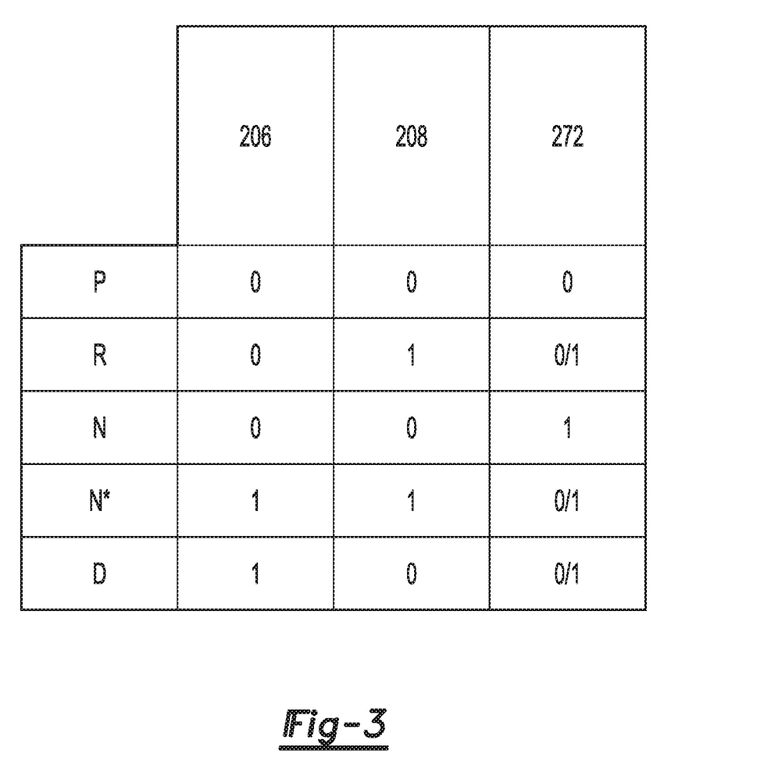
FIG. 3 is a truth table illustrating exemplary positions of selected valves of the hydraulic control system of FIGS. 1, 2A, and 2B and resultant modes of operation depending on the valve positions, including park, reverse, neutral, and forward drive, in accordance with the principles of the present disclosure.

Referring to FIG. 3, each of the mode valves 206, 208 and the OOP solenoid 272 are moveable between a first position, indicated by a "0" in FIG. 3, and a second position, indicated by a "1" in FIG. 3. Depending on the position of each of the mode valves 206, 208 and the OOP solenoid 272, the transmission may be in (forward) drive, reverse, park, or neutral. For example, when each of the mode valves 206, 208 and the OOP solenoid 272 are in the first position, or the "0" position, the transmission 14 is in park. When each of the mode valves 206, 208 is in the first position, or the "0" position, but the OOP solenoid 272 is in the second position, or the "1" position, the transmission 14 is in neutral. In addition, when each of the mode valves 206, 208 is in the second position, or the "1" position, the transmission 14 is also in neutral, regardless of whether the OOP solenoid 272 is in the "0" or "1" position.

In fact, when either or both of the mode valves 206, 208 is placed in the second position, or the "1" position, the range state of the transmission 14 does not depend on the position of the OOP solenoid 272. Thus, when the first mode valve 206 is in the first position, or the "0" position, and the second mode valve 208 is in the second position, or the "1" position, the transmission 14 is in reverse, regardless of the position of the OOP solenoid 272. Similarly, but reversed, when the first mode valve 206 is in the second position, or the "1" position, and the second mode valve 208 is in the first position, or the "0" position, the transmission 14 is in drive, or the forward drive mode, regardless of the position of the OOP solenoid 272.

Each of the mode valves 206, 208 has its own dedicated solenoid actuator valve 146, 148. Thus, each of the mode valves 206, 208 can be moved independently of, and prior to, enabling the mode valves 206, 208 with the range enable valve 194. Each of the mode valves 206, 208 may be enabled independently of the position of the range enable valve 194. Therefore, each mode valve 206, 208 may be moved and its position confirmed by its respective position sensor 260, 262 prior to providing pressurized hydraulic fluid to the clutch pressure regulation valve 216, the clutch actuation circuits 249, 252, and the park mechanism 114.

In the event of a default or loss of power to the transmission controller, the hydraulic system 100 defaults to drive as long as the transmission 14 is in drive when the default occurs. The range enable valve 194 feeds the clutch default valve 204, the clutch regulator valve 216, and the mode 1 valve 206. The clutch control solenoid 144 (that controls the feed line 218 to the primary clutch regulation valve 216) is normally high. Accordingly, in an event that the clutch control solenoid 144 loses power, the solenoid 144 will cause the primary clutch regulation valve 216 to continue to feed the first mode valve 206. Further, the binary solenoid valve 132 is also normally high and continues to allow the feed line 133 to provide the signal pressure to the clutch default valve 204, which actuates the clutch default valve 204 to connect the feed line 188 with the enablement feed line 196 to provide feed pressure ultimately to the forward clutch actuation circuit 249, because the first mode valve 206 is latched in the engaged "1" position by the drive feedback line 226 and therefore the pressured fluid from the enablement feed line 196 is connected to the OOP line 230 through ports 206E and 206F to keep the transmission 14 out of park. Thus, the clutch default valve 194 provides for "limp home protection" so that a driver is not immediately stranded upon a default or loss of power.

Thus, in the forward drive mode of operation, the hydraulic control system 100 defaults to drive. In park, reverse, or neutral, the hydraulic system 100 defaults to park. More particularly, the first mode valve 206 is in its first position "0" instead of its second position "1." Therefore, the first mode valve 206 has the drive feed line 234 exhausted. Accordingly, in the event of a default, the drive feed line 234 does not feed the forward clutch actuation circuit 249. In park, the second mode valve 208 is also in its first "0" position.

In the event of a loss of power or default while in reverse, the first mode valve 134 is in the first "0" position with the drive feed line 234 exhausted and not feeding pressure to the forward clutch actuation circuit 249, but the second mode valve 208 is in the second "1" position, feeding reverse line 236 fluid to the reverse clutch actuation circuit 252; however, because the mode valve control solenoids 146, 148 are normally low, and the second mode valve 208 is not latched in the second position, the second mode valve 208 will return to the first "0" position upon a loss of power. As such, even though the range enablement feed line 196 is pressurized upon default, the range enablement feed line 196 is merely connected ultimately to the return-to-park feed line 248 to return the transmission 14 to park. The park engagement mechanism 114 may be configured to ratchet along the park gear if the vehicle 5 is traveling above a certain speed, such as 5 mph, to slow down the vehicle 5 before bringing the vehicle 5 to a stop if a default occurs while the hydraulic control system 100 is in reverse.

Neutral follows a similar scheme as park and reverse. In neutral low, the first and second mode valves 206, 208 are in the first "0" position, and the OOP solenoid 272 is in an energized "1" position. Once the OOP solenoid 272 loses power, it reverts to the deenergized "0" position, and referring to FIG. 3, the configuration for park is then achieved, which each of the valves 206, 208, 272 being in the "0" position. In neutral high, where the first and second mode valves 206, 208 are in the second "1" position and the OOP solenoid valve 272 is in the "0" deenergized state, park is achieved upon default because the first mode valve 206 does not latch when the second mode valve 208 is in the second "1" position. (Instead, the clutch actuation drive line 226 is exhausted through port 208I.) Accordingly, upon default, both of the mode valves 206, 208 return to the first "0" position, and with the OOP solenoid 272 also being in the first "0" position, park is achieved, as shown in FIG. 3.

It should be appreciated that other orifice and check ball arrangements can be used without departing from the scope of present invention, including a single orifice for fill and exhaust, or filling through a single orifice and exhausting through two orifices. Likewise while individual fluid lines have been described, it should be appreciated that fluid lines, flow paths, passageways, etc., may contain other shapes, sizes, cross-sections, and have additional or fewer branches without departing from the scope of the present disclosure.

The description is merely exemplary in nature and variations that do not depart from the general essence of the disclosure are intended to be within the scope of the disclosure. Such variations are not to be regarded as a departure from the spirit and scope of the present disclosure.

What is claimed is:

1. A hydraulic control system for a propulsion system of a motor vehicle, the propulsion system having a continuously variable transmission, a forward clutch, and a reverse clutch, the hydraulic control system comprising:
  a pressure regulator subsystem configured to provide a pressurized hydraulic fluid;
  an electronic range selection subsystem in downstream fluid communication with the pressure regulator subsystem and having first and second outputs, the electronic range selection subsystem having a mode valve and an electronically-activated mode control valve in communication with the mode valve, the mode control valve being operable to move the mode valve between a first position and a second position, the electronic range selection subsystem being configured to selectively communicate pressurized hydraulic fluid to the forward clutch through the first output and to the reverse clutch through the second output;
  a first pulley valve configured to regulate fluid pressure to a primary pulley, the first pulley valve being actuatable by an electronically-activated primary pulley control valve; and
  a second pulley valve configured to regulate fluid pressure to a secondary pulley, the secondary pulley valve being actuatable by an electronically-activated secondary pulley control valve.

2. The hydraulic control system of claim 1, the mode valve being a first mode valve and the mode control valve being a first mode control valve, the electronic range selection subsystem further comprising:
  a second mode valve; and
  an electronically-activated second mode control valve in communication with the second mode valve, the second mode control valve being operable to move the second mode valve between a first position and a second position.

3. The hydraulic control system of claim 2, the electronic range selection subsystem further comprising a range enablement valve configured to supply pressurized hydraulic fluid to the first and second mode valves, the range enablement valve being actuatable independently of the first and second mode valves.

4. The hydraulic control system of claim 3, further comprising:
  a primary clutch pressure regulation valve; and
  a clutch default valve in fluid communication with the primary clutch pressure regulation valve, the clutch default valve being actuatable by a normally high control solenoid.

5. The hydraulic control system of claim 4, the clutch default valve being configured to supply pressured hydraulic fluid to the electronic range selection subsystem upon default, the hydraulic control system being configured to default into a forward drive mode if a default occurs while the forward clutch is in the forward drive mode.

6. The hydraulic control system of claim 5, the control solenoid being a first control solenoid, the hydraulic control system further comprising a clutch control solenoid configured to actuate the primary clutch pressure regulation valve, the clutch control solenoid being normally high.

7. The hydraulic control system of claim 6, wherein the electronic range selection subsystem is configured to communicate pressurized hydraulic fluid to the reverse clutch through the second output when the first mode valve is in the first position and the second mode valve is in the second position, the electronic range selection subsystem being configured to communicate pressurized hydraulic fluid to the forward clutch through the first outlet when the first mode valve is in the second position and the second mode valve is in the first position.

8. The hydraulic control system of claim 7, further comprising a torque converter control valve connected to a torque converter clutch and a cooler subsystem, wherein the torque converter control valve is moveable between an apply position configured to communicate pressurized hydraulic fluid to an apply side of the torque converter clutch and a release position configured to communicate pressurized hydraulic fluid with a release side of the torque converter clutch and with the cooler subsystem, the hydraulic control system further comprising a torque converter clutch pressure regulator valve and a torque converter clutch control solenoid valve, the torque converter clutch pressure regulator valve being disposed downstream of the torque converter clutch control solenoid valve and the pressure regulator subsystem and upstream of the torque converter control valve, wherein the torque converter clutch pressure regulator valve is configured to regulate a pressure of hydraulic fluid supplied by the pressure regulator subsystem and provided to the torque converter control valve based on an output from the torque converter clutch control solenoid valve.

9. The hydraulic control system of claim 8, wherein the hydraulic control system has a park mode and an out-of-park mode of operation, the hydraulic control system further comprising:
  a park servo in downstream fluid communication with the first mode valve and the second mode valve, the park servo being moveable between a park position and an out-of-park position, the park servo being latched out of park by a park control solenoid valve that is moveable between a first position and a second position; and
  a park lock mechanism mechanically coupled to the park servo, wherein the park servo is configured to mechanically move the park lock mechanism to place the hydraulic control system in the park mode when the first mode valve is in the first position, the second mode valve is in the first position, and the park control solenoid valve is in the first position, the park servo being configured to move the park lock mechanism to place the transmission in the out-of-park mode when at least one of the first mode valve, the second mode valve, and the park control solenoid valve is in the second position.

10. A hydraulic control system for a propulsion system of a motor vehicle, the propulsion system having a continuously variable transmission, a forward clutch, and a reverse clutch, the hydraulic control system comprising:
  a pressure regulator subsystem configured to provide a pressurized hydraulic fluid;
  an electronic range selection subsystem in downstream fluid communication with the pressure regulator subsystem and having first and second outputs, the electronic range selection subsystem having a first mode valve and an electronically-activated first mode control valve in communication with the first mode valve, the first mode control valve being operable to move the first mode valve between a first position and a second position, the electronic range selection subsystem having a second mode valve and an electronically-activated second mode control valve in communication with the second mode valve, the second mode control valve being operable to move the second mode valve between a first position and a second position, the electronic range selection subsystem being configured to selectively communicate pressurized hydraulic fluid to the forward clutch through the first output and to the reverse clutch through the second output, the electronic range selection subsystem further comprising a range enablement valve configured to supply pressurized hydraulic fluid to the first and second mode valves, the electronic range enablement valve being actuatable independently of the first and second mode valves.

11. The hydraulic control system of claim 10, further comprising:
a primary clutch pressure regulation valve; and
a clutch default valve in fluid communication with the primary clutch pressure regulation valve, the clutch default valve being actuatable by a normally high control solenoid.

12. The hydraulic control system of claim 11, the clutch default valve being configured to supply pressured hydraulic fluid to the range selection subsystem upon default, the hydraulic control system being configured to default into a forward drive mode if a default occurs while the forward clutch is in the forward drive mode.

13. The hydraulic control system of claim 12, the control solenoid being a first control solenoid, the hydraulic control system further comprising a clutch control solenoid configured to actuate the primary clutch pressure regulation valve, the clutch control solenoid being normally high.

14. The hydraulic control system of claim 13, wherein the electronic range selection subsystem is configured to communicate pressurized hydraulic fluid to the reverse clutch through the second output when the first mode valve is in the first position and the second mode valve is in the second position, the electronic range selection subsystem being configured to communicate pressurized hydraulic fluid to the forward clutch through the first outlet when the first mode valve is in the second position and the second mode valve is in the first position.

15. The hydraulic control system of claim 14, further comprising a torque converter control valve connected to a torque converter clutch and a cooler subsystem, wherein the torque converter control valve is moveable between an apply position configured to communicate pressurized hydraulic fluid to an apply side of the torque converter clutch and a release position configured to communicate pressurized hydraulic fluid with a release side of the torque converter clutch and with the cooler subsystem, the hydraulic control system further comprising a torque converter clutch pressure regulator valve and a torque converter clutch control solenoid valve, the torque converter clutch pressure regulator valve being disposed downstream of the torque converter clutch control solenoid valve and the pressure regulator subsystem and upstream of the torque converter control valve, wherein the torque converter clutch pressure regulator valve is configured to regulate a pressure of hydraulic fluid supplied by the pressure regulator subsystem and provided to the torque converter control valve based on an output from the torque converter clutch control solenoid valve.

16. The hydraulic control system of claim 15, wherein the hydraulic control system has a park mode and an out-of-park mode of operation, the hydraulic control system further comprising:

a park servo in downstream fluid communication with the first mode valve and the second mode valve, the park servo being moveable between a park position and an out-of-park position, the park servo being latched out of park by a park control solenoid valve that is moveable between a first position and a second position; and
a park lock mechanism mechanically coupled to the park servo, wherein the park servo is configured to mechanically move the park lock mechanism to place the hydraulic control system in the park mode when the first mode valve is in the first position, the second mode valve is in the first position, and the park control solenoid valve is in the first position, the park servo being configured to move the park lock mechanism to place the transmission in the out-of-park mode when at least one of the first mode valve, the second mode valve, and the park control solenoid valve is in the second position.

17. A hydraulic control system for a propulsion system of a motor vehicle, the propulsion system having a continuously variable transmission, a forward clutch, and a reverse clutch, the hydraulic control system comprising:
a pressure regulator subsystem configured to provide a pressurized hydraulic fluid;
an electronic range selection subsystem in downstream fluid communication with the pressure regulator subsystem and having first and second outputs, the electronic range selection subsystem having a first mode valve and an electronically-activated first mode control valve in communication with the first mode valve, the first mode control valve being operable to move the first mode valve between a first position and a second position, the electronic range selection subsystem having a second mode valve and an electronically-activated second mode control valve in communication with the second mode valve, the second mode control valve being operable to move the second mode valve between a first position and a second position, the electronic range selection subsystem being configured to selectively communicate pressurized hydraulic fluid to the forward clutch through the first output and to the reverse clutch through the second output, the range selection subsystem further comprising a range enablement valve configured to supply pressurized hydraulic fluid to the first and second mode valves, the hydraulic control system further comprising a primary clutch pressure regulation valve and a clutch default valve in fluid communication with the primary clutch pressure regulation valve, the clutch default valve being actuatable by a normally high control solenoid.

18. The hydraulic control system of claim 17, the clutch default valve being configured to supply pressured hydraulic fluid to the range selection subsystem upon default, the hydraulic control system being configured to default into a forward drive mode if a default occurs while the forward clutch is in the forward drive mode.

19. The hydraulic control system of claim 18, the control solenoid being a first control solenoid, the hydraulic control system further comprising a clutch control solenoid configured to actuate the primary clutch pressure regulation valve, the clutch control solenoid being normally high, wherein the electronic range selection subsystem is configured to communicate pressurized hydraulic fluid to the reverse clutch through the second output when the first mode valve is in the first position and the second mode valve is in the second position, the electronic range selection subsystem being configured to communicate pressurized hydraulic fluid to the forward clutch through the first outlet when the first mode valve is in the second position and the second mode valve is in the first position, the electronic range enablement valve being actuatable independently of the first and second mode valves.

20. The hydraulic control system of claim 19, wherein the hydraulic control system has a park mode and an out-of-park mode of operation, the hydraulic control system further comprising:

a park servo in downstream fluid communication with the first mode valve and the second mode valve, the park servo being moveable between a park position and an out-of-park position, the park servo being latched out of park by a park control solenoid valve that is moveable between a first position and a second position; and a park lock mechanism mechanically coupled to the park servo, wherein the park servo is configured to mechanically move the park lock mechanism to place the hydraulic control system in the park mode when the first mode valve is in the first position, the second mode valve is in the first position, and the park control solenoid valve is in the first position, the park servo being configured to move the park lock mechanism to place the transmission in the out-of-park mode when at least one of the first mode valve, the second mode valve, and the park control solenoid valve is in the second position.

\* \* \* \* \*